(12) United States Patent
Riedell

(10) Patent No.: US 6,827,312 B2
(45) Date of Patent: Dec. 7, 2004

(54) METHOD AND SYSTEM OF THERMAL PROTECTION

(75) Inventor: James Albert Riedell, San Diego, CA (US)

(73) Assignee: Coi Ceramics, Inc., San Diego, CA (US)

( * ) Notice: Subject to any disclaimer, the term of this patent is extended or adjusted under 35 U.S.C. 154(b) by 18 days.

(21) Appl. No.: 10/304,236

(22) Filed: Nov. 25, 2002

(65) Prior Publication Data

US 2003/0131982 A1 Jul. 17, 2003

Related U.S. Application Data

(60) Provisional application No. 60/333,862, filed on Nov. 27, 2001.

(51) Int. Cl.$^7$ ................................................. B64G 1/58
(52) U.S. Cl. .................................. 244/158 A; 244/133
(58) Field of Search ......................... 244/158 R–158 A, 244/131–133, 121, 117 R, 119; 52/404.2, 506.05; 428/117, 288, 698, 116, 118, 375, 368

(56) References Cited

U.S. PATENT DOCUMENTS

| | | | |
|---|---|---|---|
| 4,344,591 A | | 8/1982 | Jackson |
| 4,439,968 A | * | 4/1984 | Dunn .......................... 52/404.2 |
| 4,919,366 A | * | 4/1990 | Cormier ....................... 244/160 |
| 5,118,552 A | * | 6/1992 | Sempolinski ................. 428/98 |
| 5,310,592 A | * | 5/1994 | Baker et al. ................. 428/117 |
| 5,489,074 A | * | 2/1996 | Arnold et al. ........... 244/158 A |
| 5,560,569 A | * | 10/1996 | Schmidt ................... 244/117 R |
| 5,803,402 A | | 9/1998 | Krumweide et al. |
| 6,412,251 B1 | * | 7/2002 | Early .......................... 52/783.1 |
| 6,674,585 B1 | * | 1/2004 | Calvet et al. ................ 359/822 |

* cited by examiner

Primary Examiner—Galen Barerfoot
(74) Attorney, Agent, or Firm—Michael Blaine Brooks, P.C.; Michael Blaine Brooks

(57) ABSTRACT

A method and system for assembly and attachment of high temperature materials used as thermal protection systems (TPS) for applications such as re-entry or hypersonic vehicles are disclosed. The attachment system comprises a fastener that passes through an aperture of and a fitting attached to a ceramic matrix composite (CMC) TPS panel. The flexure fitting allows thermal growth in the panel while providing a structurally stiff interface to support the panel through structural and acoustic loading. The flexure fitting is detachably attached to the substructure, or fuel tank of a vehicle. The fastened connection is accessed through an aperture via an access cover plate conformal to the surface of the CMC TPS panel. It is by way of the access cover that the fastened connection is externally serviced.

18 Claims, 8 Drawing Sheets

METHOD AND SYSTEM OF THERMAL PROTECTION

CROSS-REFERENCE TO RELATED APPLICATION

This application claims priority from the following U.S. Provisional Patent Application, the disclosure of which, including all appendices and all attached documents, is hereby incorporated herein by reference in its entirety for all purposes: U.S. Provisional Patent Application Ser. No. 60/333,862, of James Albert Riedell entitled, "METHOD AND SYSTEM OF MECHANICAL ATTACHMENT OF HIGH TEMPERATURE THERMAL PROTECTION," filed Nov. 27, 2001.

FEDERALLY SPONSORED RESEARCH

The invention was made with Government support under F33615-00-C-3004 awarded by the Department of the Air Force. The Government has certain rights in the invention.

FIELD OF THE INVENTION

This invention relates to thermal protection systems for re-entry or hypersonic vehicles and more particularly relates to a method and system for assembly and attachment of high temperature materials.

BACKGROUND OF THE INVENTION

Since the onset of space exploration, thermal protection systems (TPS) have played a key role in enabling vehicular travel to and from space. Thermal protection systems are comprised of a variety of materials and configurations with the purposes of protecting a vehicle, structure and/or instrumentation from the thermal and environment effects of rapidly re-entering earth's atmosphere. During the course of any one mission, a vehicle is exposed to launch conditions, micrometeorite impacts, extreme temperatures in rarified atmospheric conditions and runway debris, all of which can cause damage to the TPS. To this effect, it is highly desirable to have a protection system maintainable with low operating cost.

An example of a currently used and experienced thermal protection system is seen on the Space Shuttle Orbiter. This vehicle utilizes numerous materials to protect it from the harsh re-entry environment. The windward acreage of the Shuttle is covered with tiles made of rigid ceramic foam. These tiles are termed alumina enhanced thermal barrier (AETB) tiles and are bonded to the vehicle's aluminum sub-structure and thereby provide a smooth aerodynamic surface and a thermal barrier. The leeward acreage is also protected from the re-entry environment, albeit an environment less severe than windward, with ceramic insulation in the form of blankets that are also bonded to the outer surface of the vehicle. Each of these types of insulation are considered parasitic in that they are bonded to the vehicle to provide thermal protection but do not substantively add to its structural integrity because they do not posses adequate structural strength. In the case of the tile applications, each piece is custom fit to exacting specifications and attached to the vehicle with an elaborate bonding procedure. When a tile is damaged, the individual tile is removed and the process must be repeated and inspected to assure that the replacement tile, when installed, meets the vehicle's requirements. This replacement and inspection process is very time consuming and is a costly part of the operation of the Space Shuttle Orbiter.

The Space Shuttle Orbiter also utilizes load-carrying thermal protection in the form of carbon/carbon (C/C) composites that can be found on the nose cap of the vehicle. This material differs from the aforementioned TPS in that it is a fiber reinforced composite material that is better suited to accommodating structural loading. Typically, the backside of each C/C component is insulated and then each C/C component is attached to the vehicle's substructure via bolts, or some other suitable method, that is generally inaccessible from outside the vehicle.

There is a need for new method and system for attaching thermal barrier panels subject to re-entry environments to underlying vehicle surfaces with the panels exhibiting having improved structural properties over tile and blanket applications.

SUMMARY

The method and system of attachment and assembly applies self-fixturing using integral tenons and mortises and other composite manufacturing methods to high temperature structures. The method and system of attachment permits efficient attachment of a TPS panel to the substructure or fuel tank of the vehicle using TPS panel fittings, flexure fittings, and fasteners. The present invention allows the TPS panel to be installable, removable and replaceable via fastener access from the exterior of the vehicle provided by access cover plates. Additionally, the present invention enables the user to rapidly service the vehicle for low cost, quick turnaround similar to commercial aircraft-like operations.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

It is advantageous that the present invention provides a manufacturing assembly process that uses flatstock such a ceramic matrix composites to fabricate complex three-dimensional structures such as thermal protection panels from self-fixturing components where the panels are fastenable as an array on a vehicle substructure in a manner that allows ready access to the fasteners of each panel for panel replacement. Precision water jet machining of the flatstock, derived from design computer-aided design (CAD) files, is used to prepare self-fixturing interlocking details within and about the flatstock, now subpanels, via matching tenons and mortices where the subpanels are subsequently adhesively bonded into complex structures.

The application of the method of TPS fabrication of the present invention using high temperature composite materials allows for low cost, rapid fabrication of complex TPS assemblies capable of withstanding high thermal, acoustic and structural loads. In alternative embodiments, the TPS with the disclosed system of attachment, may be fabricated with other composite manufacturing methods such as molding, co-curing, stitching and woven preforms.

The method of attachment, via a bolted, or otherwise fastened, interface, allows for the rapid removal of a given TPS panel and eliminates the need to destroy the panel, or tile, as is the case for a bonded AETB tile that has been damaged. The method of attachment also provides ready access to the substructure or systems below the TPS that may need to be worked, or replaced.

Figure 1A:
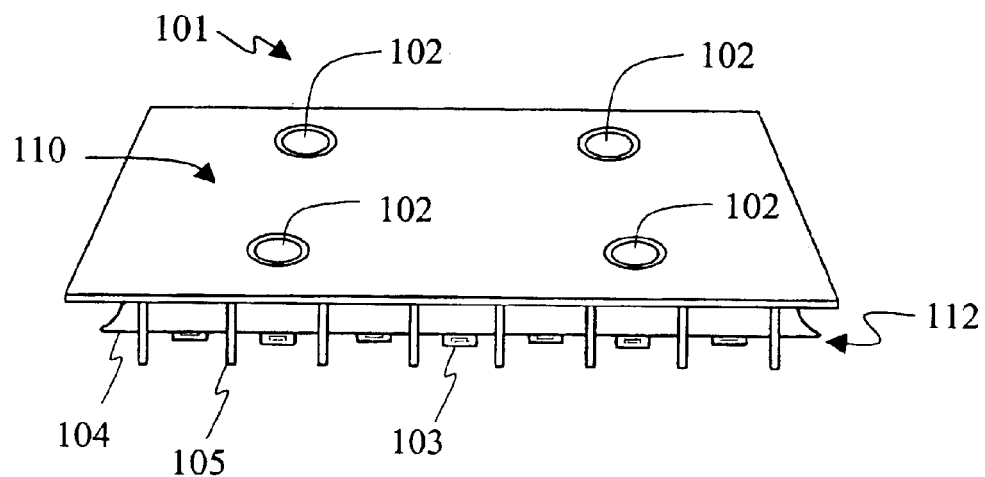
FIG. 1A is a top-side perspective view of the face skin and rib subassembly of an embodiment of the invention.
Figure 1B:
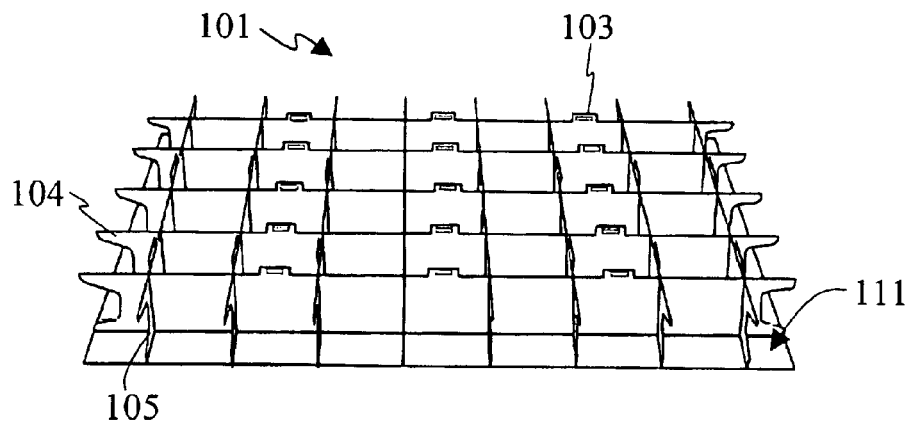
FIG. 1B is a bottom-side perspective view of the face skin and rib subassembly of an embodiment of the invention.
Figure 1C:
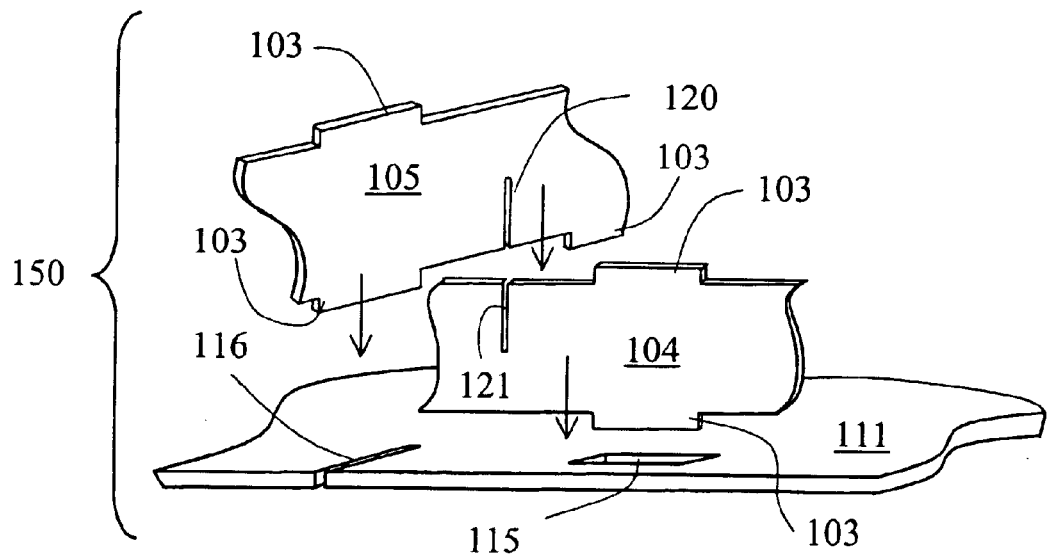
FIG. 1C the tenons and mortises used in assembly of flat stock into the skin and rib subassembly of an embodiment of the invention.

FIG. 1A illustrates a top-side perspective view of the upper portion 101 of the TPS panel, i.e., the face skin and rib subassembly 101. The example TPS panel includes a skin 110 attached to a rib structure 112 comprised of interlocking lateral 104 and transverse subpanels 105 fabricated from flat stock of composite material such as a ceramic matrix composite (CMC). The example TPS panel illustrated throughout is substantially rectangular in its application footprint, however the several embodiments of the present invention are shaped according to application requirements. Further, the example TPS panel is illustrated as flat while the several embodiments of the present invention take the form of surfaces with curvature according to application requirements. The several embodiments of the present invention have at least one access aperture per panel and four access apertures 102 are illustrated along the face skin 110. A plurality of tenons 103 are provided along the lateral 104 and transverse 105 subpanels that comprise the rib subassembly 112. The tenons of the subpanels 104, 105 that engage mortises of the underside of the face skin are cut to as to be flush with the skin surface 110. FIG. 1B illustrates a bottom-side perspective view of the face skin and rib subassembly 101. This view illustrates that the ribs are comprised of flat stock comprising the lateral 104 and transverse 105 subpanels interlocked in a grid layout and attached to the underside of the face skin 111. FIG. 1C illustrates the assembly orientation 150 onto the underside of an example face skin 111 having mortises 115 for receiving tenons 103 of the lateral subpanels 104 and mortices 116 for receiving tenons 103 of the transverse subpanels 105 with an example transverse subpanel 105 having tenons 103 and interlocking grooves 120 and an example lateral subpanel 104 having tenons 103 and interlocking grooves 121. In the process of skin and rib assembly, the lateral subpanel 104 engages the underside of the face skin 111 with the tenons 103 entering the mortises 115 of the underside of the face skin 111. The transverse subpanels 105 engage the lateral subpanels 104 by mutual insertion into the grooves 120, 121, and the transverse subpanels 105 engage the underside of the face skin 111 with the tenons 103 entering the mortises 116. At all tenon-mortise joints, the engagement of the matched tenon and mortise produces a friction fit that is made permanent by adhesive or other bonding agents applied to fixedly attach the subpanels 104, 105 and skin 111.

Figure 2A:
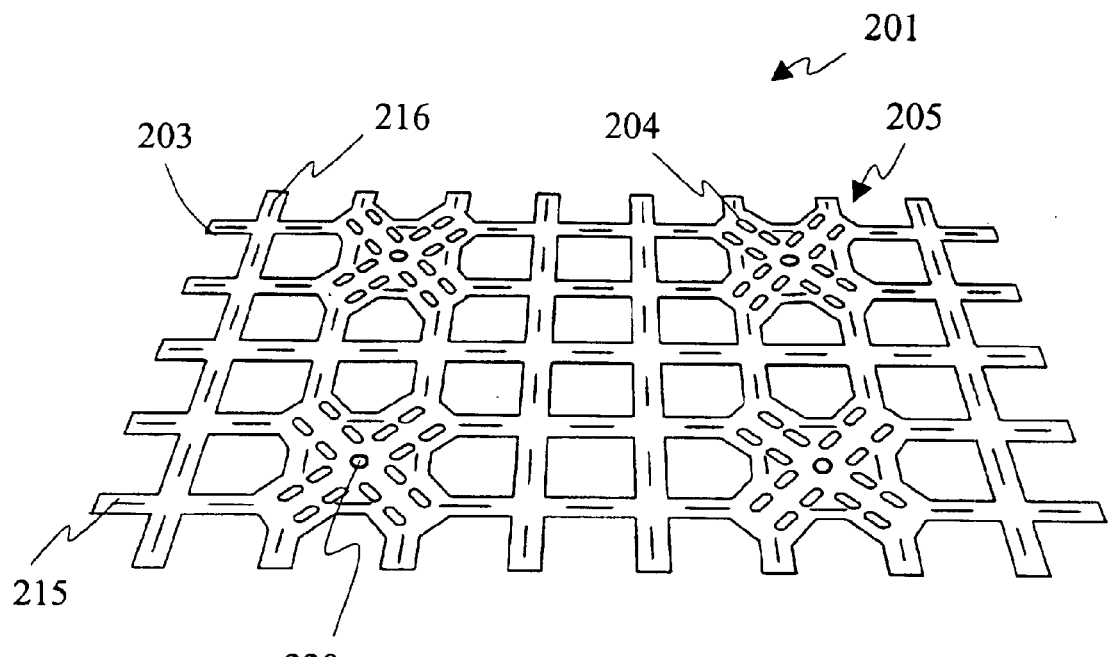
FIG. 2A is a top-side perspective view of the back skin subassembly of an embodiment of the invention.
Figure 2B:
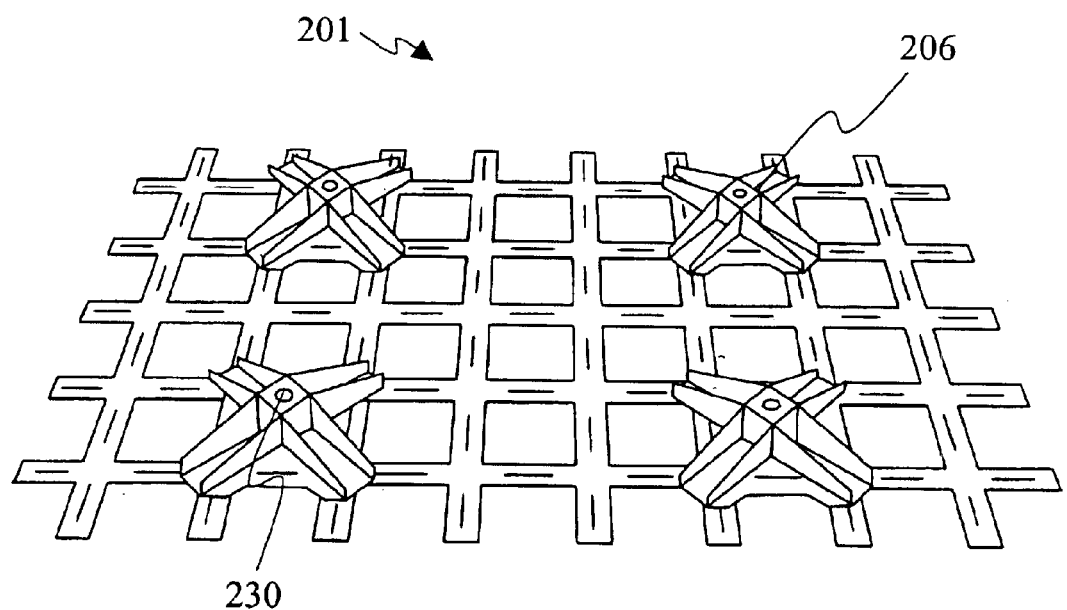
FIG. 2B is a bottom-side perspective view of the back skin subassembly of an embodiment of the invention.

FIG. 2A illustrates a top-side perspective view of the lower portion 201 of the TPS panel, i.e., the back skin subassembly 201. A plurality of laterally oriented mortises 215 and a plurality of transversely oriented mortises 216 are provided along the lattice 203 for receiving the tenons 103 of the face skin and rib subassembly 112. A plurality of diagonally oriented mortises 204 are provided in a footprint array 205 for receiving attachment fittings. The center of each footprint has an aperture 220 that serves as a portion of a fastener conduit of the fully assembled TPS. FIG. 2B illustrates a bottom-side perspective view of the back skin subassembly 201 with four attachment fittings 206 having tenons (not shown) engaging the lattice 203 via the plurality of diagonally oriented mortises 204. Each of the attachment fittings 206 has an aperture 230 that serves as a portion of a fastener conduit of the fully assembled TPS.

Figure 3:
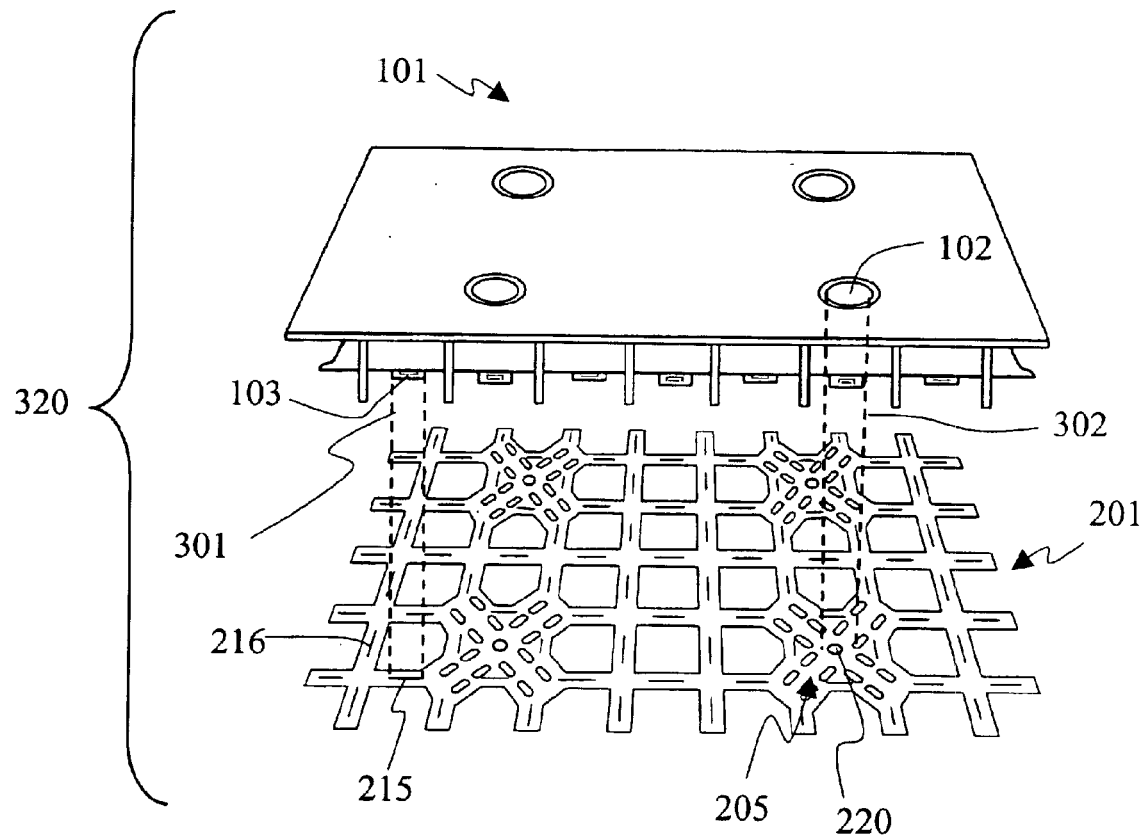
FIG. 3 is a perspective view of face skin and rib subassembly aligned with a back skin subassembly of an embodiment of the invention.

FIG. 3 illustrates a perspective view for an example TPS assembly 320 the face skin and rib subassembly 101 aligned for attachment to the back skin assembly 201. The tenons 103 of the face skin and rib subassembly 101 engage the mortises 215, 216 of the back skin assembly 201 resulting in the access apertures 102 being aligned over the center aperture 220 of the fixture footprint 205.

Figure 4:
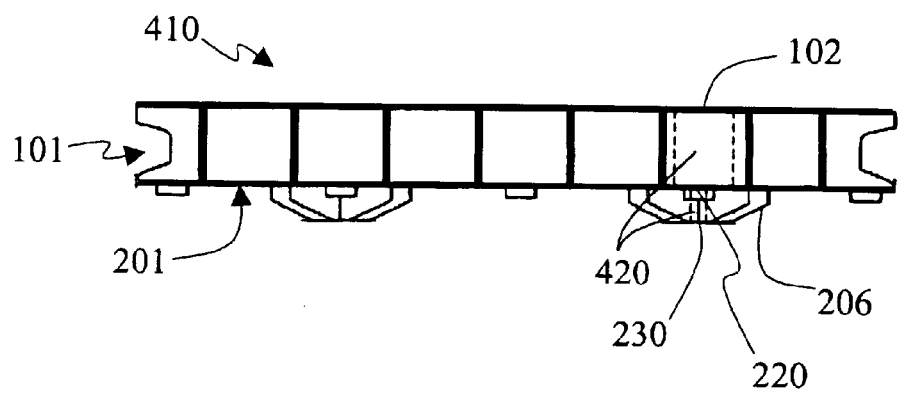
FIG. 4 is a side view of a face skin and rib subassembly attached to a back skin subassembly of an embodiment of the invention.

FIG. 4 illustrates in side view the face skin and rib subassembly 101 after it is attached to a back skin subassembly 201 now comprising an example TPS panel 410. The attachment fittings 206 of the TPS panel 410, each having an aperture 230 aligned with an access aperture 102 and a lattice footprint aperture 220, provide a fastener conduit 420.

Figure 5:
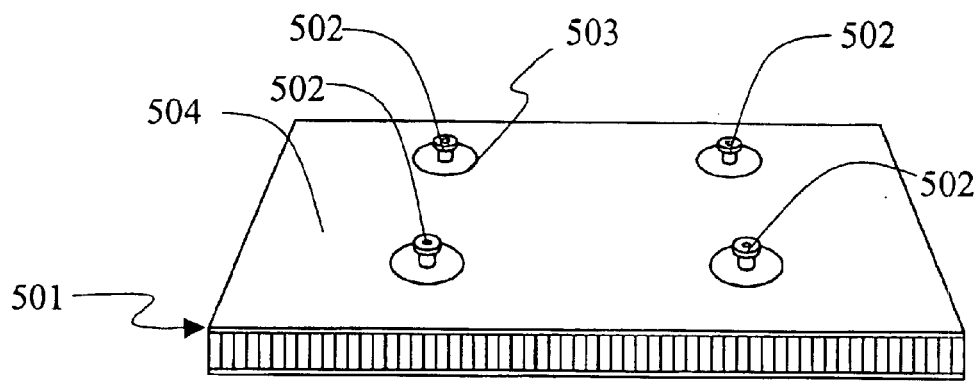
FIG. 5 is a perspective view of a representative fuel tank panel as a substructure with flexure fittings of an embodiment of the invention.

FIG. 5 illustrates a perspective view of an example section of a vehicle fuel tank panel or substructure 501. In this example, each of the four flexure fittings 502 for receiving a fastener have a footing 503 that is attached via adhesive or mechanically attached to the outer surface of the vehicle fuel tank panel 504.

Figure 6:
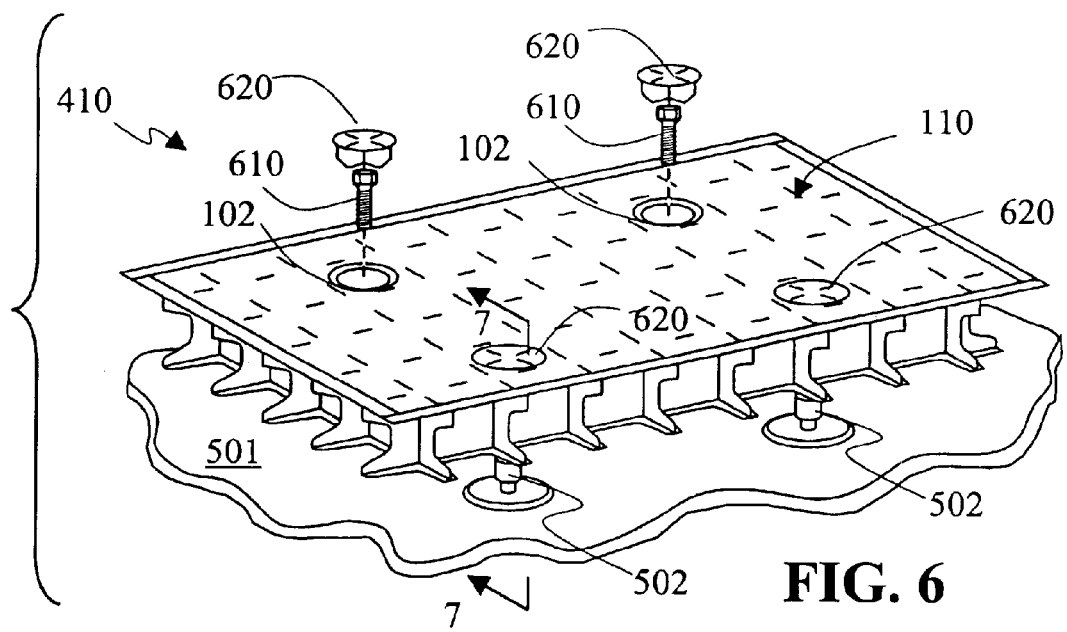
FIG. 6 is an isometric view of a mechanically attached TPS panel embodiment of the present invention without interstitial insulating blankets.

FIG. 6 illustrates the TPS panel 410 oriented with each aperture of each attachment fitting aligned with a matched flexure fitting 502 so that each fastener conduit of the TPS panel 410 is aligned with a flexure fitting 502 whereby a fastener 610, such as a bolt, may be inserted into an access aperture 102 through the fastener conduit and engage the flexure fitting 502. After the fastener is inserted and engaged, an attachment cover plate 620 is engaged at the access aperture 102 to seal the fastener conduit and provide a substantially uniform skin surface 110. In this example, the fastener 610 is a bolt that passes through an aperture 102 in the skin 110, a fastener conduit 420 (not shown) created by the subpanels 104, 105 of the rib assembly and partially through an aperture 230 of a fitting 206 attached to the back skin subassembly 201 of the TPS panel 410. The bolt 610 engages the flexure 502 and the flexure 502 allows for thermal growth in the TPS panel 410 while providing a structurally stiff interface to support the panel 410 through structural and acoustic loading. The flexure fitting 502 is bonded or attached to the substructure 501 or fuel tank of the vehicle at the footing 503. The fastener 610 creating the fastened connection is accessed through an aperture 102 after the ready removal of an access cover plate 620 on the surface 110 of the panel 410. Accordingly, it is by way of the access cover plate 620 that the fastened connection is serviceable from the exterior of the vehicle having the substructure 501.

Figure 7:
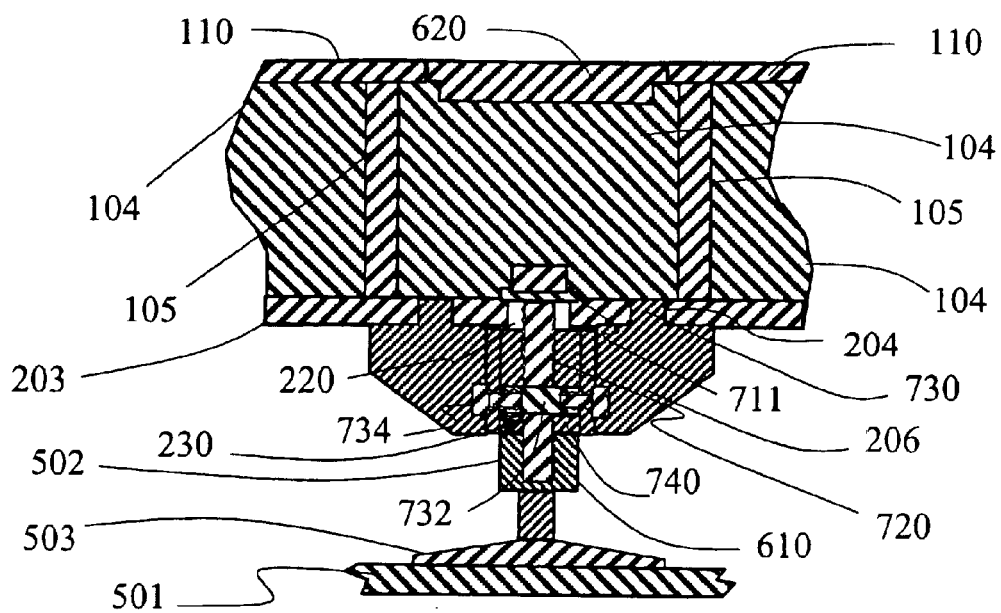
FIG. 7 is a cross-section view of an attachment fitting section of an embodiment of the invention.

FIG. 7 is a cross-sectional view 7 of one of the means of attachment. The attachment cover plate 620 is shown engaged with the skin 110 of the TPS panel 410 creating a substantially uniform surface 110 and covering a fastener conduit that is bounded in part by the local lateral subpanels 104 and the local transverse subpanels 105. The lattice aperture 220 and the inner portion 720 of the attachment fitting 206 also comprise a portion of the fastener conduit. The tenons 730 of the attachment fitting 206 engage the bottom portion of the TPS panel 410 particularly at the attachment fixture footprint mortises 204 of the lattice 203. A fitting 732, preferably of titanium, is attached internal to the attachment fitting 206 by fasteners 734 to the inner base 740 of the attachment fitting 206. The bolt 610 engages the flexure fitting 502 by extending out of the attachment fitting 206 through an aperture 230 with the head of the bolt 610 bearing on a washer 711 and the inner portion of the lattice 203 about the lattice aperture 220.

Figure 8:
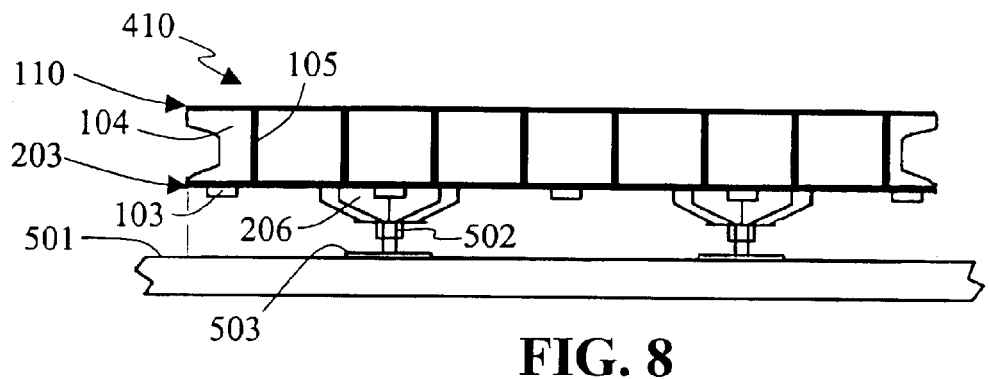
FIG. 8 is a side view of an assembled TPS panel embodiment of the invention attached to a substructure.

FIG. 8 is a side view example of an assembled TPS panel 410 attached to a substructure 501. This example TPS panel is eighteen inches long, twelve inches wide and approximately two inches in depth from skin 110 to lattice 203 and three and one-half inches in depth from skin 110 to footing 503.

Figure 9:
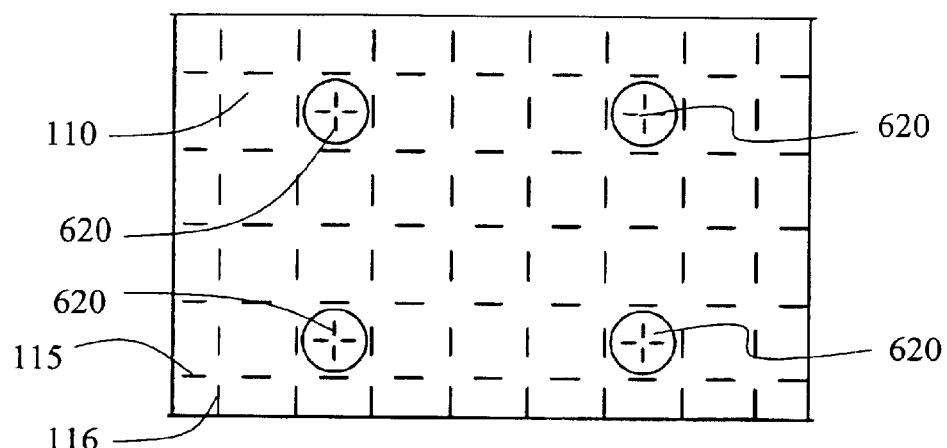
FIG. 9 is a top view of an example TPS panel embodiment of the invention attached.

FIG. 9 is a top view of an example TPS panel 410 illustrating four engages attachment cover plates 620 and the lateral mortises 115 and transverse mortises 116 used for rib attachments on the inward side 111 of the skin 110.

Figure 10:
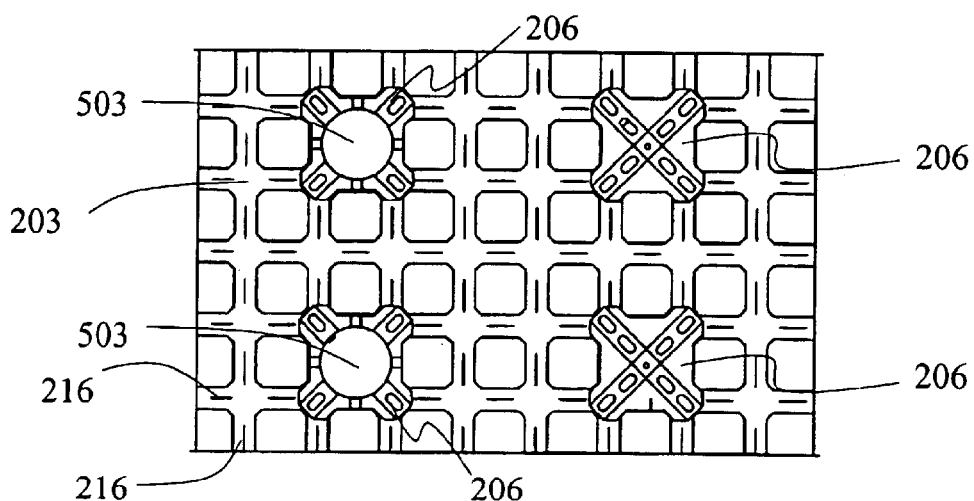
FIG. 10 is a bottom view of an example TPS panel embodiment of the invention attached.

FIG. 10 is a bottom view of an example TPS panel 410 illustrating the attachment fixtures 206 with and without flexure fittings 502 including their footings 503.

Figure 11:
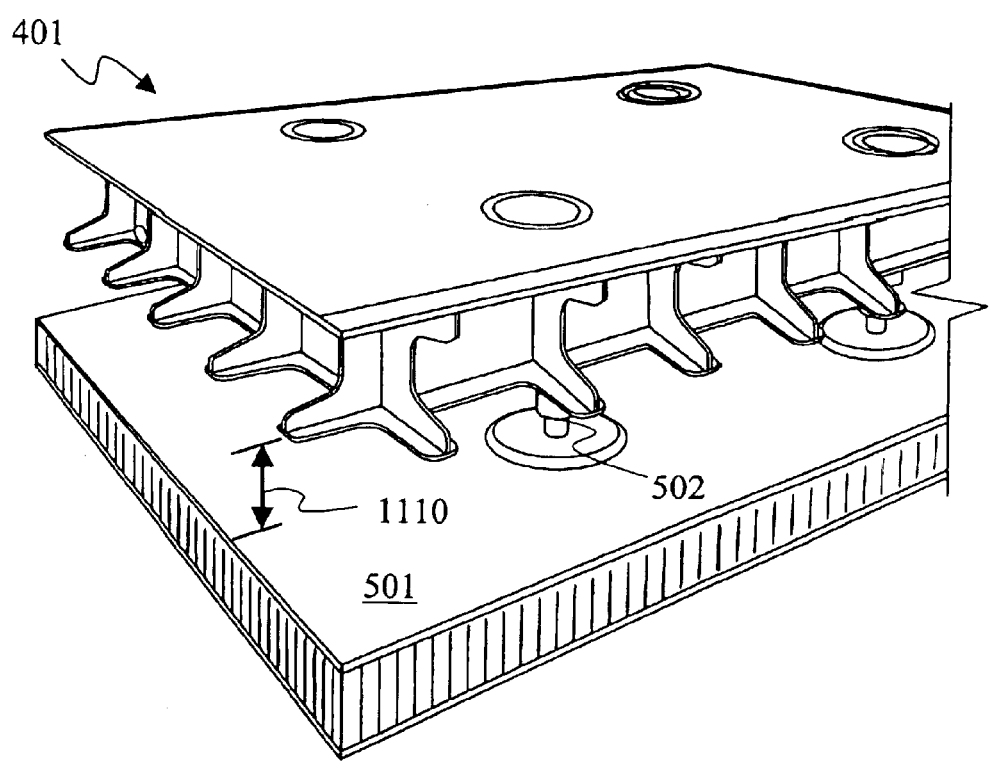
FIG. 11 is a perspective view the mechanically attached TPS panel embodiment of the invention attached where the interstitial insulation is not shown.

FIG. 11 is a perspective view of an example of an attached TPS panel 401 mechanically attached to a substructure 510. The TPS panel is comprised of materials such as CMC that provide insulation for the substructure. In order to increase the heat insulation, one or more insulating blankets can be applied in the region 1110 created between the TPS panel 401 and the substructure 501 by the attachment fixture 206 and flexure fitting 502.

Figure 12A:
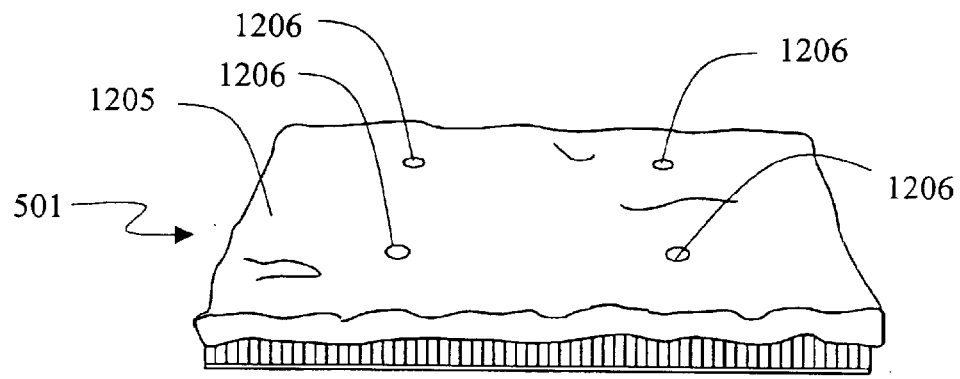
FIG. 12A is a perspective view of a representative substructure covered by a first insulation blanket.
Figure 12B:
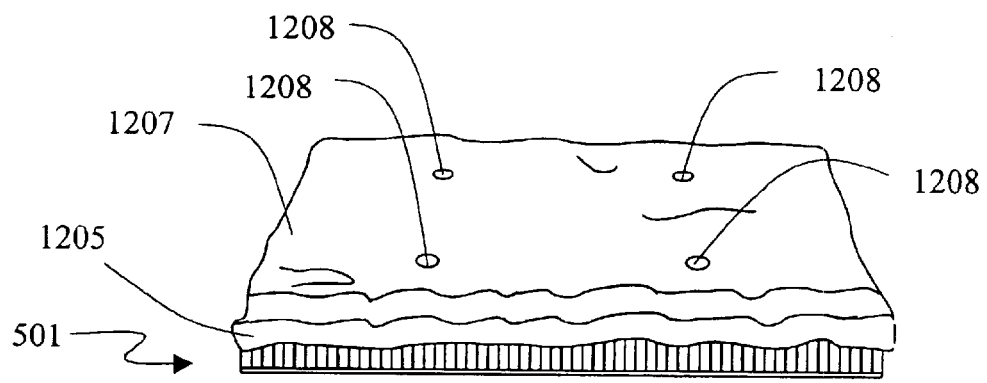
FIG. 12B is a perspective view of a representative substructure covered by a first insulation blanket and a second insulation blanket.

FIG. 12A illustrates a perspective view of an example section of a vehicle fuel tank panel or substructure 501 with a first insulating blanket 1205 applied. The first insulating blanket 1205 has a plurality of apertures 1206 and is oriented so that the apertures align with the flexure fittings 206. FIG. 12B illustrates a perspective view of an example section of a vehicle fuel tank panel or substructure 501 with a second insulating blanket 1207 applied over the first insulating blanket 1205 applied. The second insulating blanket 1207 has a plurality of apertures 1208 and is oriented so that the apertures align with the flexure fittings 206 and conform to the bottom of the TPS panel 410. Alternative embodiments have one blanket of total thickness equivalent to the sum of the first and second insulating blankets and other embodiments apply other high temperature insulating materials, but in all applications, apertures are provided in the interstitial insulating material so as to support fastener travel.

Figure 13:
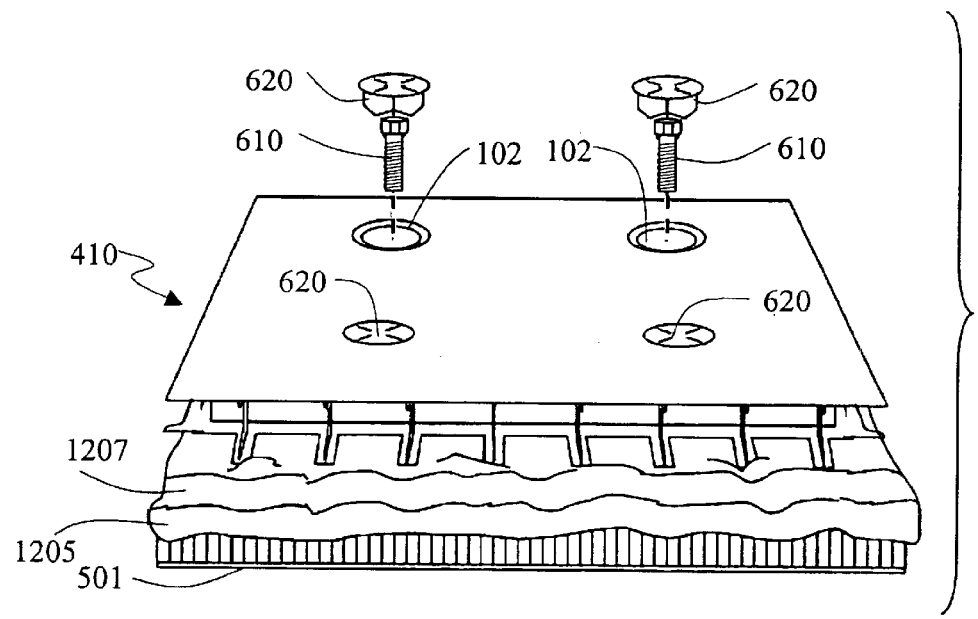
FIG. 13 is a perspective view of a representative substructure covered by a first insulation blanket, a second insulation blanket and TPS assembly embodiment of the invention attached.
Figure 14:
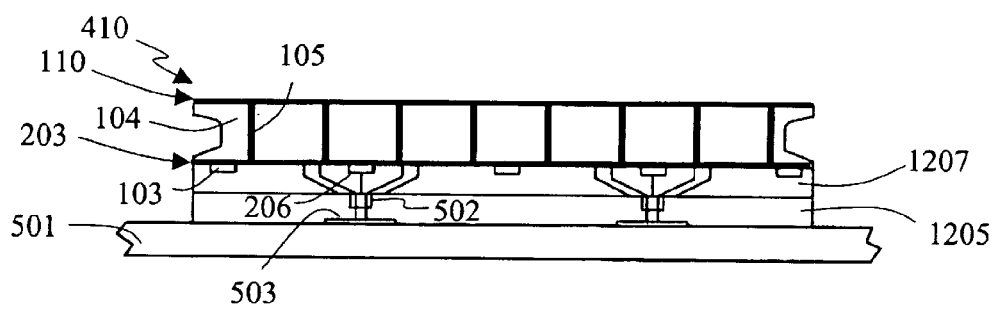
FIG. 14 is a side view an example TPS assembly embodiment of the invention attached mechanically attached to a substructure with two insulating blankets between the assembly and the substructure.

FIG. 13 is a perspective view of a representative substructure 501 covered by a first insulation blanket 1205, a second insulation blanket 1207 and TPS assembly 410 where the access apertures of the TPS assembly are aligned over the first and second blanket apertures 1205, 1207. Fasteners 610 are then inserted into access apertures and through the fastener conduit to engage the flexure attachments. Thereafter, the access apertures 102 are covered with access cover plates 620. FIG. 14 illustrates in side view an example TPS assembly 410 mechanically attached to a substructure 501 with two insulating blankets 1205, 1207 between the assembly 410 and the substructure 501.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, the The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. A thermal protection member formed of multiple parts assembled together to form the thermal protection member, the member comprising:
a skin member having an inward side and an outward side, the skin member having an array of mortises aligned laterally and an array of mortises aligned transversely, the skin member having at least one access aperture;

a lattice member having an inward side and an outward side, the lattice having a first array of mortises aligned laterally, a second array of mortises aligned transversely, a plurality of diagonally oriented mortises in at least one fixture attachment footprint pattern, and the lattice having an aperture at the center of each of the at least one fixture attachment footprint patterns;

a plurality of lateral subpanels arrayed substantially parallel to each other and substantially perpendicular to the skin member, each having a plurality of rigid tenons disposed along a first lateral edge and a plurality of rigid tenons disposed along a second lateral edge and each having a plurality of slots disposed along the second lateral edge, the plurality of rigid tenons disposed along the first lateral edge engaging the laterally aligned mortises of the skin member, the plurality of rigid tenons disposed along the second lateral edge engaging the laterally aligned mortises of the lattice member;

a plurality of transverse subpanels arrayed substantially parallel to each other, each substantially perpendicular to the skin member and each substantially perpendicular to the plurality of lateral subpanels, each of the plurality of transverse subpanels having a plurality rigid tenons disposed along a first lateral edge and a plurality of rigid tenons disposed along a second lateral edge and each having a plurality of slots disposed along the first lateral edge; the plurality of rigid tenons disposed along the first lateral edge engaging the transversely aligned mortises of the skin member, the plurality of rigid tenons disposed along the second lateral edge engaging the laterally aligned mortises of the lattice member, the slots disposed along the first lateral edges of the plurality of transverse subpanels engaging the slots disposed along the second lateral edges of the plurality of lateral subpanels;

at least one fixture attachment having a plurality of rigid tenons disposed along a plurality of mounting edges, the plurality of rigid tenons of the at least one fixture attachment engaging the plurality of diagonally oriented mortises of the lattice; and at least one access cover panel for covering the at least one skin member access aperture.

2. The thermal protection member of claim 1 further comprising:

at least one flexure fitting having a footing, and at least one fastener mounted within and extending from the at least one fixture attachment, the at least one fastener engaging the at least one flexure fitting.

3. The thermal protection member of claim 2 wherein the fastener is a bolt.

4. The thermal protection member of claim 1 wherein the skin member, lattice member, plurality of lateral subpanels and plurality of transverse subpanels are formed of composite material.

5. The thermal protection member of claim 1 wherein the skin member, lattice member, plurality of lateral subpanels and plurality of transverse subpanels are formed of ceramic matrix composite material.

6. A method of constructing a thermal protection member, the method comprising the steps of:

assembling: (a) a skin member having an inward side and an outward side, the skin member having an array of mortises aligned laterally and an array of mortises aligned transversely, the skin member having at least one access aperture; (b) a lattice member having an inward side and an outward side, the lattice having a first array of mortises aligned laterally, a second array of mortises aligned transversely, a plurality of diagonally oriented mortises in at least one fixture attachment footprint pattern, and the lattice having an aperture at the center of each of the at least one fixture attachment footprint patterns; (c) a plurality of lateral subpanels arrayed substantially parallel to each other and substantially perpendicular to the skin member, each having a plurality of rigid tenons disposed along a fist lateral edge and a plurality of rigid tenons disposed along a second lateral edge and each having a plurality of slots disposed along the second lateral edge; (d) a plurality of transverse subpanels arrayed substantially parallel to each other, each substantially perpendicular to the skin member and each substantially perpendicular to the plurality of lateral subpanels, each of the plurality of transverse subpanels having a plurality rigid tenons disposed along a first lateral edge and a plurality of rigid tenons disposed along a second lateral edge and each having a plurality of slots disposed along the first lateral edge; and (e) at least one fixture attachment having a plurality of rigid tenons disposed along a plurality of mounting edges;

connecting: (a) the plurality of rigid tenons disposed along the first lateral edge of the plurality of lateral subpanels to the laterally aligned mortises of the skin member and the plurality of rigid tenons disposed along the second lateral edge of the plurality of lateral subpanels to the laterally aligned mortises of the lattice member; (b) the plurality of rigid tenons disposed along the first lateral edge of the plurality of transverse subpanels to the transversely aligned mortises of the skin member, the plurality of rigid tenons disposed along the second lateral edge of the plurality of transverse subpanels to the laterally aligned mortises of the lattice member and the slots disposed along the first lateral edges of the plurality of transverse subpanels to the slots disposed along the second lateral edges of the plurality of lateral subpanels; (c) the plurality of rigid tenons of the at least one fixture attachment to the plurality of diagonally oriented mortises of the lattice; wherein each connected tenon and motise forms a joint; and applying an adhesive to each tenon and mortise joint.

7. The method of claim 6 further comprising the steps of:

assembling at least one flexure fitting having a footing, at least one fastener and at least one access cover panel;

mounting within and extending from the at least one fixture attachment, the at least one fastener;

connecting the at least one flexure fitting with at least one flexure fitting via the at least one fastener; and and covering the at least one access aperture with at least one access cover panel.

8. The method of claim 6 wherein the skin member, lattice member, plurality of lateral subpanels and plurality of transverse subpanels are formed of composite material.

9. A system of attachment of high temperature materials used as thermal protection systems; the attachment system comprising:

a ceramic matrix composite thermal protection systems panel comprised of at least one panel aperture, a skin member, a lattice member, and a plurality of lateral subpanels transversely arrayed with a plurality of transverse subpanels, wherein the plurality of lateral subpanels and the plurality of transverse panels are substantially perpendicularly interposed between the skin member and the lattice member;

a plurality of interface fittings, each individually mounted to the lattice member and substantially aligned with a respective panel aperture;

a plurality of fasteners, each individually translatable through a respective panel aperture and interface fitting; and a plurality of flexure fittings attached to a substructure; each flexure fitting substantially aligned with a respective panel aperture and interface fitting to receive one of the plurality of fasteners and thereby detachably attaching the panel to the substructure by way of the plurality of flexure fittings and causing a plurality of fastening connections.

10. A system of attachment of high temperature materials used as thermal protection systems; the attachment system comprising:

a ceramic matrix composite thermal protection systems panel comprised of at least one panel aperture;

a plurality of interface fittings, each individually mounted to the panel and substantially aligned with a respective panel aperture;

a plurality of fasteners, each individually translatable through a respective panel aperture and interface fitting;

a plurality of flexure fittings attached to a substructure; each flexure fitting substantially aligned with a respective panel aperture and interface fitting to receive one of the plurality of fasteners and thereby detachably attaching the panel to the substructure by way of the plurality of flexure fittings and causing a plurality of fastening connections;

at least one thermal blanket installed within the interstitial region formed between the ceramic matrix composite thermal protection systems panel and the substructure, the at least one thermal blanket having a plurality of apertures, each of the apertures aligned with a respective flexure fitting; and a plurality of access cover plates, each detachably attached to the panel and covering each respective aperture substantially conformal to the panel; whereby each fastening connection is accessed via an aperture covered by a cover plate.

11. A method of attachment of high temperature materials used as thermal protection systems; the method of attachment comprising the steps of:

aligning at least one interface fitting to at least one aperture of a ceramic matrix composite thermal protection systems panel wherein the panel further comprises of a skin member, a lattice member, and a plurality of lateral subpanels transversely arrayed with a plurality of transverse subpanels, wherein the plurality of lateral subpanels and the plurality of transverse panels are substantially perpendicularly interposed between the skin member and the lattice member;

attaching the aligned at least one interface fitting to the lattice member;

aligning at least one flexure fitting to the at least interface fitting;

attaching the aligned at least one flexure fitting to a common substructure;

translating each of the at least one fastener through its panel aperture and its aligned interface fitting to a point of insertion into its aligned flexure fitting for detachable attachment of the panel to the substructure;

detachably attaching with the at least one fastener the panel to the at least one flexure fitting thereby causing a plurality fastening connections between the panel and the substructure; and detachably attaching a plurality of access cover plates to the panel thereby conformally covering each respective aperture;

whereby the high temperature materials arc detachably attached with fastened connections accessible through their respective apertures.

12. A method of attachment of high temperature materials used as thermal protection systems; the method of attachment comprising the steps of:

aligning at least one interface fittings to at least one aperture of a ceramic matrix composite thermal protection systems panel;

attaching the aligned at least one interface fitting to the panel;

aligning at least one flexure fitting to the at least interface fitting;

attaching the aligned at least one flexure fitting to a common substructure;

installing at least one thermal blanket within the interstitial region formed between the ceramic matrix composite thermal protection systems panel and the substructure, the at least one thermal blanket having a plurality of apertures, each of the apertures aligned with a respective flexure fitting;

translating each of the at least one fastener through its panel aperture and its aligned interface fitting to a point of insertion into its aligned flexure fitting for detachable attachment of the panel to the substructure;

detachably attaching with the at least one fastener the panel to the at least one flexure fitting thereby causing a plurality fastening connections between the panel and the substructure; and detachably attaching a plurality of access cover plates to the panel thereby conformally covering each respective aperture;

whereby the high temperature materials are detachably attached with fastened connections accessible through their respective apertures via said cover plates.

13. A thermal protection member comprising:

a skin member having an array of mortises aligned laterally and an array of mortises aligned transversely and at least one access aperture;

a lattice member having a first array of mortises aligned laterally, a second array of mortises aligned transversely, a plurality of mortises in at least one fixture attachment footprint pattern, and the lattice having an aperture proximate to the center of each of the at least one fixture attachment footprint patterns;

a plurality of lateral subpanels arrayed substantially parallel to each other and substantially perpendicular to the skin member, each having a plurality of rigid tenons disposed along a first lateral edge and a plurality of rigid tenons disposed along a second lateral edge and each having a plurality of slots disposed along the second lateral edge, the plurality of rigid tenons disposed along the first lateral edge engaging the laterally aligned mortises of the skin member, the plurality of rigid tenons disposed along the second lateral edge engaging the laterally aligned mortises of the lattice member;

a plurality of transverse subpanels arrayed substantially parallel to each other, each substantially perpendicular to the skin member and each transversely oriented with respect to the plurality of lateral subpanels, each of the plurality of transverse subpanels having a plurality rigid tenons disposed along a first lateral edge and a plurality of rigid tenons disposed along a second lateral edge and each of the plurality of transverse subpanels having a plurality of slots disposed along the first lateral edge; the plurality of rigid tenons disposed along the first lateral edge engaging the transversely aligned mortises of the skin member, the plurality of rigid tenons disposed along the second lateral edge engaging the laterally aligned mortises of the lattice member, the slots disposed along the first lateral edges of the plurality of transverse subpanels engaging the slots disposed along the second lateral edges of the plurality of lateral subpanels; and at least one fixture attachment having a plurality of rigid tenons disposed along a plurality of mounting edges, the plurality of rigid tenons of the at least one fixture attachment engaging the plurality of mortises in the at least one fixture attachment footprint pattern.

14. The thermal protection member of claim 13 further comprising:

at least one access cover panel for covering the at least one skin member access aperture.

15. The thermal protection member of claim 13 further comprising:

at least one flexure fitting having a footing, and at least one fastener mounted within and extending from the at least one fixture attachment, the at least one fastener engaging the at least one flexure fitting.

16. The thermal protection member of claim 15 wherein the fastener is a bolt.

17. The thermal protection member of claim 13 wherein the skin member, lattice member, plurality of lateral subpanels and plurality of transverse subpanels are formed of composite material.

18. The thermal protection member of claim 13 wherein the skin member, lattice member, plurality of lateral subpanels and plurality of transverse subpanels are formed of ceramic matrix composite material.

* * * * *

UNITED STATES PATENT AND TRADEMARK OFFICE
CERTIFICATE OF CORRECTION

PATENT NO. : 6,827,312 B2  
DATED : December 7, 2004  
INVENTOR(S) : James Albert Riedell It is certified that error appears in the above-identified patent and that said Letters Patent is hereby corrected as shown below:

Column 6,
Line 34, "...claims. For example, the ..." should read -- ...claims. ... --

Column 8,
Line 11, "...a fist lateral edge and a plurality of rigid tenons ..." should read -- ...a first lateral edge and a plurality of rigid tenons ... --
Line 54, "...and covering the at least one access aperture with at least ..." should read -- ...covering the at least one access aperture with at least ... --

Signed and Sealed this

Twenty-sixth Day of April, 2005

JON W. DUDAS
*Director of the United States Patent and Trademark Office*